(12) United States Patent
Newlands et al.

(10) Patent No.: US 9,194,511 B2
(45) Date of Patent: Nov. 24, 2015

(54) VALVE STEM SEAL ARRANGEMENT

(75) Inventors: Nick Newlands, Snarøya (NO); Olle Säfvenberg, Piteå (SE); Bengt Dahlborg, Charlottenberg (SE); Øystein Møgedal, Borgen (NO)

(73) Assignee: Aker Subsea AS, Lysaker (NO)

( * ) Notice: Subject to any disclaimer, the term of this patent is extended or adjusted under 35 U.S.C. 154(b) by 78 days.

(21) Appl. No.: 14/116,519

(22) PCT Filed: May 8, 2012

(86) PCT No.: PCT/NO2012/050082
§ 371 (c)(1),
(2), (4) Date: Nov. 8, 2013

(87) PCT Pub. No.: WO2012/154056
PCT Pub. Date: Nov. 15, 2012

(65) Prior Publication Data
US 2014/0084199 A1    Mar. 27, 2014

(30) Foreign Application Priority Data

May 9, 2011  (NO) .................................. 20110678

(51) Int. Cl.
| F16K 31/44 | (2006.01) |
| F16J 15/18 | (2006.01) |
| F16J 15/26 | (2006.01) |
| F16K 41/04 | (2006.01) |
| E21B 33/128 | (2006.01) |
| E21B 34/04 | (2006.01) |

(52) U.S. Cl.
CPC ................ *F16K 41/04* (2013.01); *E21B 34/04* (2013.01)

(58) Field of Classification Search
CPC ......... F16K 41/04; F16K 41/06; E21B 34/00; E21B 34/04
USPC ........................... 251/214; 277/323, 339, 511
See application file for complete search history.

(56) References Cited

U.S. PATENT DOCUMENTS

| 3,379,405 A | 4/1968 | Natho |
| 3,477,731 A * | 11/1969 | Workman ..................... 277/558 |

(Continued)

FOREIGN PATENT DOCUMENTS

| EP | 0485743 A1 | 5/1992 |
| EP | 0525261 A1 | 2/1993 |

OTHER PUBLICATIONS

Al-Amiri, Thamir J., "International Search Report," prepared for PCT/NO2012/050082, as mailed Jul. 13, 2012, 3 pages.

*Primary Examiner* — Craig Schneider
*Assistant Examiner* — Frederick D Soski
(74) *Attorney, Agent, or Firm* — Winstead PC

(57) ABSTRACT

The invention provides a valve useful as a production valve in or connected to a production tree subsea, and other similar uses subsea or topside, the valve comprises a valve element, a valve element pressure housing, an actuator, a stem and a bonnet, the actuator is via the stem operatively arranged to close or open a fluid passageway through the valve element, the bonnet enclose the stem and is connected to the valve element pressure housing and seals are arranged between the stem and the bonnet for sealing against the pressure of the valve element pressure housing. The valve is distinctive in that the valve comprises at least one seal for sealing between stem and bonnet, the seal having identical inner sealing diameter against the stem and outer sealing against a single body or element of the bonnet.

7 Claims, 3 Drawing Sheets

DETAIL OF STEM SEALS AND SUPPORT

(56) References Cited

U.S. PATENT DOCUMENTS

| | | | |
|---|---|---|---|
| 4,169,605 A * | 10/1979 | Nishimoto et al. | 277/584 |
| 4,451,047 A * | 5/1984 | Herd et al. | 277/539 |
| 4,576,385 A | 3/1986 | Ungchusri et al. | |
| 4,886,241 A * | 12/1989 | Davis et al. | 251/214 |
| 5,083,749 A | 1/1992 | Linderman et al. | |
| 5,131,666 A * | 7/1992 | Hutchens | 277/523 |
| 5,221,063 A | 6/1993 | Wafer et al. | |
| 5,230,498 A * | 7/1993 | Wood et al. | 251/214 |
| 5,593,166 A * | 1/1997 | Lovell et al. | 277/516 |
| 6,840,520 B2 * | 1/2005 | Faas et al. | 277/511 |
| 7,121,554 B2 * | 10/2006 | Lugovskoy et al. | 277/531 |

* cited by examiner

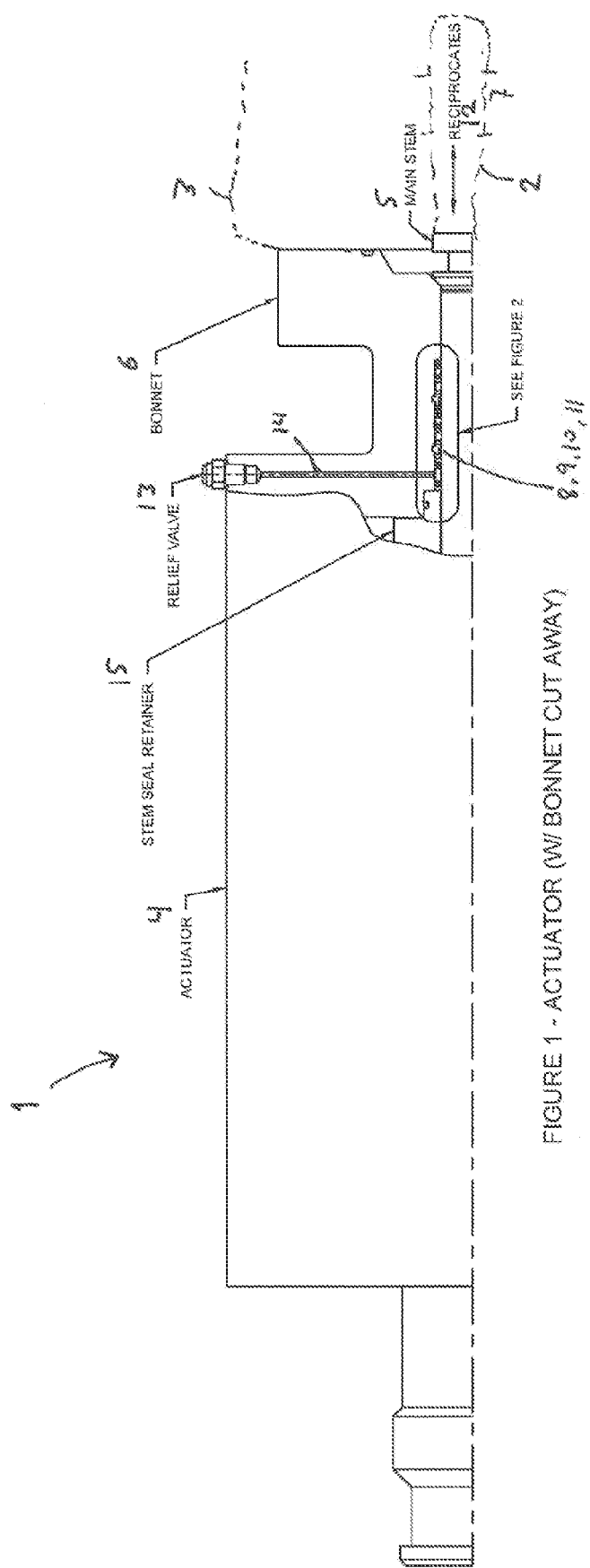

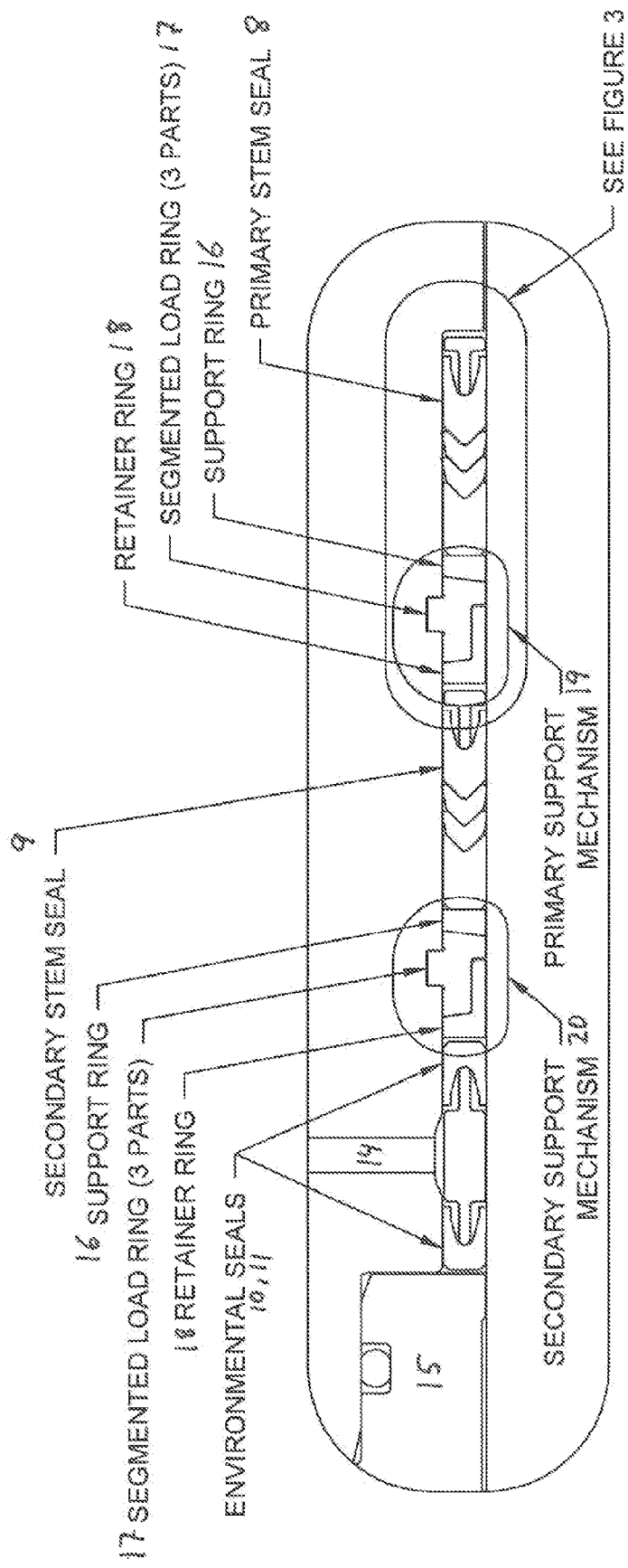
FIGURE 2 - DETAIL OF STEM SEALS AND SUPPORT

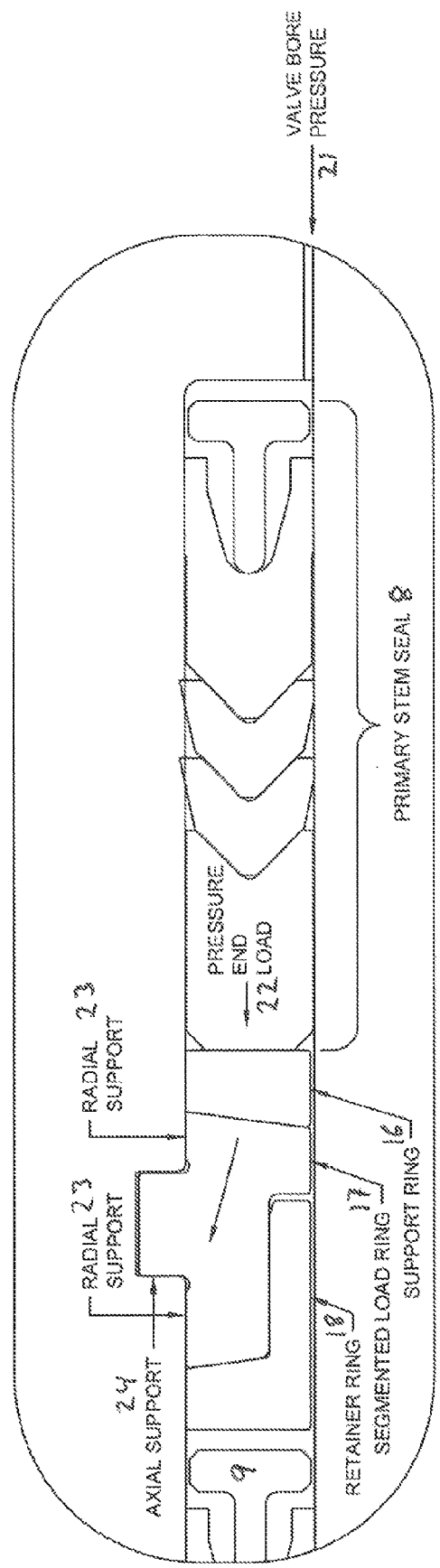
FIGURE 3 - DETAIL OF SUPPORT MECHANISM / LOAD PATH

VALVE STEM SEAL ARRANGEMENT

FIELD OF THE INVENTION

The present invention relates to valves useful for closing off or opening up for fluid at high pressure, such as a production valve for connection to or integration with a subsea XT (Christmas tree) for production of oil and gas. More specifically, the invention relates to the seals of subsea valves for control of production of oil and gas as well as the seals of other similar valves.

BACKGROUND OF THE INVENTION AND PRIOR ART

Production of oil, condensate and gas from reservoirs located subsea, more and more often is from wellheads located on the seabed. A subsea XT (Christmas tree) is located on such wellheads, providing valves for control between the wellhead and the choke valve. The XT valves are typically either open or closed for production flow. The valves are usually gate valves controlled via a reciprocating function of an actuator. The actuator can be designed as a spring loaded piston where the piston rod is extended to open the valve when hydraulic pressure or electric power is applied to the actuator.

The piston rod is typically coaxial to the valve stem, and said elements operate as one element and they can be one single element or be divided into sections. The valve stem connects the actuator to a valve element, often termed a gate, in a pressure housing containing the valve element. At least a part of the valve stem is exposed to the pressure of the pressure housing of the valve as it may be extended into said pressure housing. The valve stem can be a single or several coaxial lengths.

Sealing against the pressure of the valve housing takes place between the valve stem and a bonnet surrounding the valve stem. In a typical sealing arrangement the seals comprise primary and secondary dynamic seals, and also further seals. Currently the secondary seal is held in a carrier. This results in the need for a static seal on the outer diameter surface of the carrier, toward the bonnet. Such prior design has evolved under considerations with respect to assembly, maintenance and replacement. However, the prior design results in several seals of different design, geometry and pressure integrity, resulting in a voluminous and complex seal arrangement providing several paths for leakage and making testing and qualification of each seal very difficult. Therefore, a demand exists for a new valve stem seal arrangement providing improvements with respect to number and length of leakage paths, number of different designs and geometries providing simplified seal arrangement, prolonged service life, allowing smaller dimensions and simplifications with respect to testing, qualification and maintenance. The objective of the present invention is to meet the demand.

SUMMARY OF THE INVENTION

The demand is met with the valve according to the invention.

More specifically, the invention provides a valve useful as a production valve in or connected to a production tree subsea, and other similar uses subsea or topside, the valve comprises a valve element, a valve element pressure housing, an actuator, a stem and a bonnet, the actuator is via the stem operatively arranged to close or open a fluid passageway through the valve element, the bonnet enclose the stem and is connected to the valve element pressure housing and seals are arranged between the stem and the bonnet for sealing against the pressure of the valve element pressure housing. The valve is distinctive in that the valve comprises at least one seal for sealing between stem and bonnet, the seal having identical inner sealing diameter against the stem and outer sealing against a single body or element of the bonnet.

Preferably, the sealing elements for sealing the stem to the bonnet are of the same inner and outer seal diameter, such as a single seal and an environmental seal arranged between the valve stem and the single body or single element of the bonnet; or primary seals, secondary seals and environmental seals arranged between the valve stem and the single body or single element of the bonnet. Preferably all seals are identical. This will reduce the number of seal geometries and simplify testing and maintenance. Alternatively, different seal geometries can be used.

Preferably, each of the single seal or primary and secondary seals, on the side away from the pressure housing and in direction away from the pressure housing, are supported by a support mechanism consisting of a support ring followed by a segmented load ring followed by a retainer ring. The support ring, load ring and retainer ring in combination are termed primary and secondary support mechanisms, respectively, for valve embodiments with primary and secondary seals. Preferably the support ring on the axial surface away from the pressure housing is inclined outward, the facing axial surface of the segmented load ring is correspondingly inclined inward, the segmented load ring on the axial face away from the pressure housing comprises an axial surface that is inclined inward and the facing axial surface of the retainer ring comprises an axial surface that correspondingly is inclined outward. Inclined outward means that a normal vector directed out from the surface of the relevant element points outward from the valve stem axis, which is divergent and away from the valve stem axis. Inclined inward means that a normal vector directed out from the surface of the relevant element points inward to the valve stem axis, which is convergent to the valve stem axis so that such inward normal vectors will meet at the stem axis. Such normal vectors can be said to lie in a cone plane, whereby inclined inward vectors point at the cone apex whilst inclined outward vectors point away from the cone apex. Due to said inclinations, axial forces on the seals and support mechanisms provide a force component pressing the segmented load ring toward the bonnet or bonnet element and a protrusion around the segmented load ring outer surface will be pressed into an adapted groove around the inner surface of the bonnet or bonnet element. This arrangement ensures that very high forces, corresponding to many hundreds of bar, can be handled by the valve stem seal arrangement without extrusion of material, unwanted displacements or rotations of elements or leakages of fluid.

Preferably, the segmented load ring comprises a protrusion around the radial outer surface, the protrusion fits into an adapted groove around the inner surface of the bonnet or bonnet element, the groove is deeper than the height of the protrusion. The groove preferably has axial side surfaces and the protrusion has axial side surfaces, the axial side surfaces providing axial support.

The segmented load ring in cross section preferably has a wedge-like shape, the widest part of the wedge is at the upper radial outer surface, so that axial forces acting on the segmented load ring will provide a force component pressing the segmented load ring toward the bonnet or bonnet element and the protrusion of the segmented load ring will be pressed into the groove of the bonnet or bonnet element.

Preferably the retainer ring in cross section has an L-shape, the bottom part of the L lay toward the stem and partly under the segmented load ring, the part of the L under the segmented load ring fits into an adapted step-out or cut-out of the segmented load ring, and preferably said step-out or cut-out is wider than the part of the L inside it. This helps to retain the segmented load ring in position, be it in operation or during installation. The segmented load ring preferably comprises three segments, as this is a good compromise between sufficient segments to allow installation and keeping the number of parts down.

The reduced number of seals, reduced dimensions of seals and types of seals, and no seal carriers, are crucial for providing improvements with respect to the number and length of leakage paths, number of different designs and geometries, and simplifications with respect to testing, qualification and maintenance, and prolonged service life.

FIGURES

The invention is illustrated with four figures, of which:

FIG. 1 illustrates, with the bonnet and valve pressure housing cut away, an embodiment of a valve according to the invention, FIG. 2 illustrates in further detail the stem seals and support of FIG. 1, and FIG. 3 illustrates in larger detail the stem seals and support of FIG. 2.

DETAILED DESCRIPTION

Reference is made to FIG. 1 illustrating an embodiment of a valve 1 according to the invention, more specifically a subsea XT production valve. The valve comprises a valve element 2, a valve element housing 3, an actuator 4, a stem 5 and a bonnet 6. The actuator 4 is via the stem 5 operatively arranged to close or open a fluid passageway 7 through the valve element 2, the bonnet enclose the stem 5 and is connected to the valve element housing, and seals 8,9,10,11 are arranged between the stem and the bonnet for sealing against the pressure of the valve element pressure housing. All seals 8,9,10,11 for sealing between stem and bonnet have identical inner sealing diameter against the stem 5 and outer sealing against a single body or element of the bonnet 6. The valve is, as obvious for the person skilled in the art, a gate valve with non-restricted or full through bore or passageway when open for flow, as illustrated. Reciprocating action 12 of the stem opens or closes the passageway 7 for flow. The valve comprises a relief valve 13, such as a check valve, arranged in a bore 14 between two environmental seals 10,11 for relief of production flow in the extremely unlikely situation that production flow leaks past the primary and secondary seals. Such relief prevents fluid from entering the control system, thereby ensuring that the valve can be operated even in a leakage situation. The environmental seals are arranged to seal against fluid ingress from the bore 14 but allow leakage toward said bore. The valve stem seal arrangement is held in place on the stem by a stem seal retainer 15.

The valve stem seal arrangement is illustrated in further detail in FIG. 2, to which reference is made. In direction away from the valve element and valve housing that may contain high pressure fluid, the valve stem seal arrangement comprises a primary seal 8, a support ring 16, a segmented load ring 17, a retainer ring 18, a secondary stem seal 9, a support ring 16, a segmented load ring 17, a retainer ring 18, a first environmental seal 10 oppositely oriented, a relief bore 14, a second environmental seal 11 and the stem seal retainer 15.

The combinations of support ring, segmented load ring, in the illustrated embodiment in three parts, and retainer ring, constitutes a primary 19 and secondary 20 support mechanism, respectively.

Further reference is made to FIG. 3, illustrating in further detail the primary seal 8 and primary support mechanism 19 of FIG. 2. More specifically, the mechanism and load path is illustrated in addition to the primary seal 8 and primary support elements support ring 16, segmented load ring 17 and retainer ring 18. A valve bore pressure, as illustrated by arrow 21, which can be higher than 150 bar, such as 690 bar, acts on the pressure side of the primary seal 8, which results in an axial force, a pressure end load 22, from the side of the primary seal toward the support ring. The facing surface of the support ring is axial, but the surface of the support ring away from the pressure 21 is inclined outward. The segmented load ring comprises a surface inclined inward on the pressure side and also a surface inclined inward on the side away from the pressure. The retainer ring 18 comprises a surface inclined outward facing the oppositely inclined surface of the segmented load ring. Axial forces, that are forces parallel with the valve stem axis, will be decomposed to have a radial component in addition to the axial component when the force is acting over facing inclined surfaces. Axial forces acting on the segmented load ring will have a radial outward component pushing the segmented load ring outward, against the bonnet or bonnet element, against which the segmented load ring has radial support 23 and axial support 24. In other words this means that the segmented load ring, in cross section, is shaped like a wedge that is wider further out from the stem axis, so that axial pressure on the segmented load ring will provide an outward radial pressure component balanced by radial support pressure on the non-protrusion outer radial surfaces of the segmented load ring. The protrusion is not as high as the groove is deep, which is assumed to be beneficial for withstanding the highest pressures without leakage. The axial side surfaces of the protrusion and groove provides axial support and acts to maintain the primary seal in position.

The figures reveal several design details specific for the illustrated embodiment and typical for a valve according to the invention for the intended purpose. But said details, as well as the preferable features of the invention, may vary within wide limits, provided the obligatory features of the independent claim are maintained. The valve of the invention may include the features as described or illustrated in any operative combination, which combinations are part of the invention.

The invention claimed is:

1. A valve useful as a production valve in or connected to a production tree subsea, and other similar uses subsea or topside, the valve comprising:
    a valve element;
    a valve element pressure housing;
    an actuator;
    a stem; and
    a bonnet;
    at least one seal for sealing between stem and bonnet, the seal having a uniform inner sealing diameter against the stem and a uniform outer sealing against the bonnet;
    wherein the actuator via the stem is operatively arranged to close or open a fluid passageway through the valve element;
    wherein the bonnet encloses the stem and is connected to the valve element pressure housing and the at least one seal is arranged between the stem and the bonnet for sealing against the pressure of the valve element pressure housing;

wherein the at least one seal seals on the side away from the pressure housing and in a direction away from the pressure housing and are supported by a support mechanism comprising a support ring followed by a segmented load ring followed by a retainer ring; and wherein the segmented load ring in cross section has a wedge-like shape, a widest part of the wedge is at an upper radial outer surface, so that axial forces acting on the segmented load ring will provide a force component pressing the segmented load ring toward the bonnet or bonnet element and a protrusion of the segmented load ring will be pressed into a groove of the bonnet or bonnet element.

2. The valve according to claim 1, wherein the at least one seal for sealing the stem to the bonnet is of the uniform inner seal diameter and the uniform outer seal diameter, and an environmental seal arranged between the valve stem and the single body or single element of the bonnet; or primary seals, secondary seals and environmental seals arranged between the valve stem and the single body or single element of the bonnet.

3. The valve according to claim 1, wherein the support ring on an axial surface away from the pressure housing is inclined outward, a facing axial surface of the segmented load ring is correspondingly inclined inward, the segmented load ring on the axial face toward the pressure housing comprises an axial surface that is inclined inward and the facing axial surface of the retainer ring comprises an axial surface that correspondingly is inclined outward.

4. The valve according to claim 1, wherein the retainer ring in cross section comprises an L-shape, a bottom part of the L lay toward the stem and partly under the segmented load ring, a part of the L under the segmented load ring fits into an adapted step-out or cut-out of the segmented load ring.

5. The valve according to claim 1, wherein the segmented load ring comprises three segments.

6. The valve according to claim 1, wherein the segmented load ring comprises a protrusion around the radial outer surface, the protrusion fits into an adapted groove around the inner surface of the bonnet or bonnet element, the groove is deeper than the height of the protrusion.

7. The valve according to claim 6, wherein the groove comprises axial side surfaces and the protrusion comprises axial side surfaces, the axial side surfaces of the groove and the axial side surfaces of the protrusion providing axial support.

* * * * *